(12) United States Patent
Cunningham et al.

(10) Patent No.: US 9,682,525 B2
(45) Date of Patent: Jun. 20, 2017

(54) SPACE-SAVING IN-FLIGHT TRASH COMPACTOR

(71) Applicant: B/E AEROSPACE, INC., Wellington, FL (US)

(72) Inventors: Craig Cunningham, Stony Stratford (GB); William Godecker, Irvine, CA (US); R. Bruce Thayer, III, San Juan Capistrano, CA (US); David Wang, Mission Viejo, CA (US); Grant West, Granada Hills, CA (US); Steven Whisler, San Juan Capistrano, CA (US)

(73) Assignee: B/E Aerospace, Inc., Wellington, FL (US)

( * ) Notice: Subject to any disclaimer, the term of this patent is extended or adjusted under 35 U.S.C. 154(b) by 881 days.

(21) Appl. No.: 13/914,315

(22) Filed: Jun. 10, 2013

(65) Prior Publication Data

US 2013/0269545 A1 Oct. 17, 2013

Related U.S. Application Data

(62) Division of application No. 13/396,920, filed on Feb. 15, 2012, now Pat. No. 8,490,543, which is a division (Continued)

(51) Int. Cl.
*B30B 13/00* (2006.01)
*B30B 15/04* (2006.01)

(Continued)

(52) U.S. Cl.
CPC .............. *B30B 15/04* (2013.01); *B30B 9/301* (2013.01); *B30B 9/3042* (2013.01);

(Continued)

(58) Field of Classification Search
CPC ......... B30B 9/30; B30B 9/301; B30B 9/3042; B30B 9/3085; B30B 9/3007;

(Continued)

(56) References Cited

U.S. PATENT DOCUMENTS 3,608,476 A  9/1971 Price et al.
3,654,855 A  4/1972 Longo (Continued)

FOREIGN PATENT DOCUMENTS

DE  10113158 A1  1/2003

OTHER PUBLICATIONS

Extended European search report and opinion issued in related application EP 14177931.4, Sep. 2, 2015, 9 pages.

(Continued)

*Primary Examiner* — Jimmy T Nguyen
(74) *Attorney, Agent, or Firm* — Drinker Biddle & Reath LLP

(57) ABSTRACT

A method for compacting trash while in-flight includes moving a storage chamber into a chamber operating position within a dead space inaccessible from in front of a galley, securing the storage chamber in the chamber operating position, executing a compaction cycle, and removing the storage chamber into a chamber maintenance position in which compacted trash is removable from the storage chamber accessible from in front of the galley.

11 Claims, 5 Drawing Sheets

Related U.S. Application Data of application No. 12/793,788, filed on Jun. 4, 2010, now Pat. No. 8,122,823.

(60) Provisional application No. 61/184,480, filed on Jun. 5, 2009.

(51) Int. Cl.

| | | |
|---|---|---|
| *B30B 15/30* | (2006.01) | |
| *B30B 1/00* | (2006.01) | |
| *B30B 9/30* | (2006.01) | |
| *B64D 11/04* | (2006.01) | |
| *B64D 11/02* | (2006.01) | |

(52) U.S. Cl.
CPC .......... *B30B 9/3075* (2013.01); *B30B 9/3085* (2013.01); *B30B 13/00* (2013.01); *B30B 15/30* (2013.01); *B64D 11/02* (2013.01); *B64D 11/04* (2013.01)

(58) Field of Classification Search
CPC ... B30B 9/3032; B30B 9/3057; B30B 9/3075; B30B 15/04; B30B 15/16; B30B 15/30; B30B 13/00; B65F 1/00; B65F 1/1405; B65F 1/141; B65F 1/1431; B64D 11/04; B64D 11/02

See application file for complete search history.

(56) References Cited

U.S. PATENT DOCUMENTS

| | | | |
|---|---|---|---|
| 3,731,616 A | 5/1973 | Ligh | |
| 3,734,006 A | 5/1973 | Hennells | |
| 3,754,503 A | 8/1973 | Hennells | |
| 3,756,143 A | 9/1973 | Hennells | |
| 4,008,658 A | 2/1977 | Stock et al. | |
| 4,022,123 A | 5/1977 | Bachmann | |
| 4,073,229 A | 2/1978 | O'Rourke et al. | |
| 4,559,870 A | 12/1985 | Krummacher et al. | |
| 4,620,479 A | 11/1986 | Diamond et al. | |
| 4,719,852 A * | 1/1988 | Durbin ................. | B30B 9/3014 100/229 A |
| 5,024,151 A * | 6/1991 | Girardin .................. | B30B 9/30 100/229 A |
| 5,218,900 A | 6/1993 | Elliott | |
| 5,259,304 A | 11/1993 | Roberts | |
| 5,263,412 A * | 11/1993 | Chenard ................. | B30B 1/006 100/229 A |
| 5,490,455 A * | 2/1996 | Conti .................... | B30B 9/3003 100/100 |
| 5,619,915 A | 4/1997 | Wagner et al. | |
| 5,813,323 A | 9/1998 | Nowak | |
| 5,960,710 A | 10/1999 | Holtom | |
| 7,191,701 B2 | 3/2007 | Fukuizumi et al. | |
| 8,122,823 B2 * | 2/2012 | Cunningham .......... | B30B 9/301 100/215 |
| 8,490,543 B2 * | 7/2013 | Cunningham .......... | B30B 9/301 100/215 |

OTHER PUBLICATIONS

European examination report issued in related application EP 14177931.4, Aug. 22, 2016, 7 pages.

* cited by examiner

SPACE-SAVING IN-FLIGHT TRASH COMPACTOR

CROSS-REFERENCE TO RELATED PATENT APPLICATIONS

This application is a divisional application of U.S. patent application Ser. No. 13/396,920, filed Feb. 15, 2012, now U.S. Pat. No. 8,490,543, which is a divisional application of U.S. patent application Ser. No. 12/793,788, filed Jun. 4, 2010, now U.S. Pat. No. 8,122,823, which claims the priority benefit of U.S. Provisional Application No. 61/184,480, filed Jun. 5, 2009, all of which are herein incorporated by reference and to all of which the priority benefit is claimed.

FIELD OF THE INVENTION

This invention generally relates to trash compactors. Specifically, the invention relates to trash compactors for use in vehicles such as an aircraft.

BACKGROUND

Often, commercial or private aircraft provide passengers and crew a galley or kitchen for food preparation and cleanup. Because of the limited physical space available for use on an aircraft, relatively little physical space may be allocated for use as a galley. Any galley equipment for food preparation or disposal must be designed to economize on the amount of space and weight used. In addition, such food preparation or disposal equipment must be safe and secure during operation in-flight.

Conventional aircraft trash compactors tend to use a large amount of space under the counter within the galley, thereby reducing the total volume of space available for stored food, or for devices for food storage, preparation or disposal.

SUMMARY

An embodiment of the invention provides a space-saving in-flight trash compactor, that may include a compactor mechanism and a storage chamber, which are adapted for easy positioning within an otherwise unused (or "dead") space in an aircraft galley. In an embodiment, either or both of the compactor mechanism and storage chamber are rotatably attached to an axle positioned below a compactor mechanism and a trash chute for swiveling around the axle to permit ease of access while removing trash from the storage chamber. In accordance with various embodiments of the invention, and as shown in FIG. 5, only a single trolley or cart 441 (typically, with width of approximately twelve inches) needs to be removed from the space adjacent to the dead space in the aircraft galley for emptying the storage chamber. Optionally, the compactor mechanism is mounted to either the same or a separate axle, permitting ease of access to the compactor mechanism during maintenance.

In some embodiments, the storage chamber is mounted on castors alone without also being rotatably attached to an axle. In still other embodiments, the storage chamber is secured to a load-bearing plate. The load-bearing plate, in turn, is slidably attached to rails that permit an easy range of motion between operating and trash removal positions. In embodiments in which the storage chamber is secured to a load-bearing plate, an actuator or actuators may be used to aid in moving the storage chamber between operating and trash removal positions.

To permit trash to be deposited from above, a trash chute and a chute interface may be formed into the storage chamber. Trash deposited in the chute is channeled by the chute to the chute interface, and by the chute interface into the main portion of the storage chamber. Optionally, the trash chute includes a flap or covering either at an end closest to the storage chamber or an end further away from the storage chamber.

Optionally, the storage chamber may also be attached to rotatable supports, such as castors or wheels. Such rotatable supports provide additional physical support to the storage chamber, especially during operation of the compactor, and do not interfere with the rotation of the storage chamber around the axle to which the storage chamber is rotatably attached.

The storage chamber optionally includes also one or more latches for securing the storage chamber in one or more positions. For example, a latch may be installed on the storage chamber to secure the storage chamber during operation of the compactor.

The trash compactor may be operated by direct or remote control. A remote control may be provided, for example, in a different physical location within the galley or even in a different crew area of the cabin. Optionally, the invention may be operated semi-automatically through use of a trash level sensor within the storage chamber in communication with the compactor mechanism.

According to an embodiment, there is provided a method for storing and compacting trash while in-flight, the method comprising the steps of: moving a storage chamber into a chamber operating position; securing the storage chamber in the chamber operating position; executing a compaction cycle; and removing the storage chamber into a chamber maintenance position.

DETAILED DESCRIPTION

Figure 1:
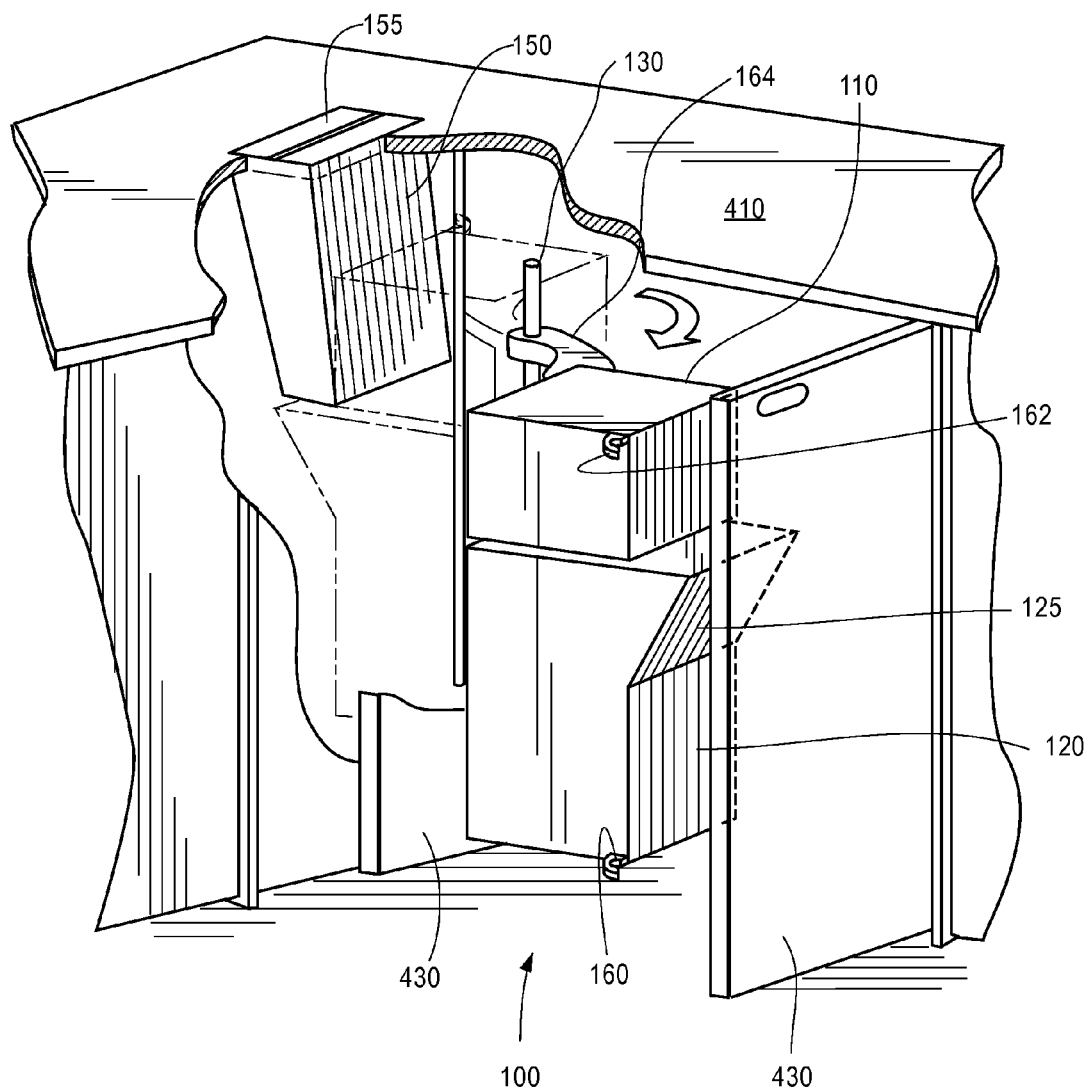
FIG. 1 shows a space-saving in-flight trash compactor rotated into a position for maintenance or trash removal, in accordance with an embodiment of the invention.

The following examples further illustrate various embodiments of the invention. Referring to FIG. 1, there is shown an embodiment of the space-saving in-flight trash compactor 100 in which the storage chamber 120 and compactor mechanism 110 have been rotated around at least one axle 130 into a position for maintenance and/or removal of trash from the storage chamber.

As shown in the embodiment of FIG. 1, the trash compactor may be generally disposed underneath a workdeck 410. Under-workdeck doors 430 are shown open, permitting rotation of compactor mechanism 110 and storage chamber 120 into positions no longer underneath workdeck 410. As shown in the alternative embodiment of FIG. 5, the workdeck 410 may also cover trolleys or carts 441, 442, and 443 without workdeck doors 430.

Several additional aspects of the features are illustrated in FIG. 1. Storage chamber 120 further comprises a chute interface 125 formed into the body of the storage chamber 120. The chute interface 125 is adapted to channel trash received from the trash chute 150 when the invention is in a position for operation. The chute interface 125 need not take the generally lip-shaped form shown in FIG. 1, but rather may be adapted to a different shape as necessary to interface with a trash chute 150. Moreover, the trash chute 150 may take a different shape, such as a cylindrical or elliptical shape.

In other embodiments, storage chamber 120 does not include a chute interface 125. In such embodiments, the chute 150 channels trash directly into the storage chamber 120. In accordance with such embodiments, the chute 150 is designed with flaps in addition to flaps 155 for pressing trash into storage chamber 120 before a compaction cycle. In accordance with such embodiments, the chute 150 is designed to slide or collapse toward the storage chamber 120 to secure any trash in the storage chamber 120 before a compaction cycle.

Figure 5:
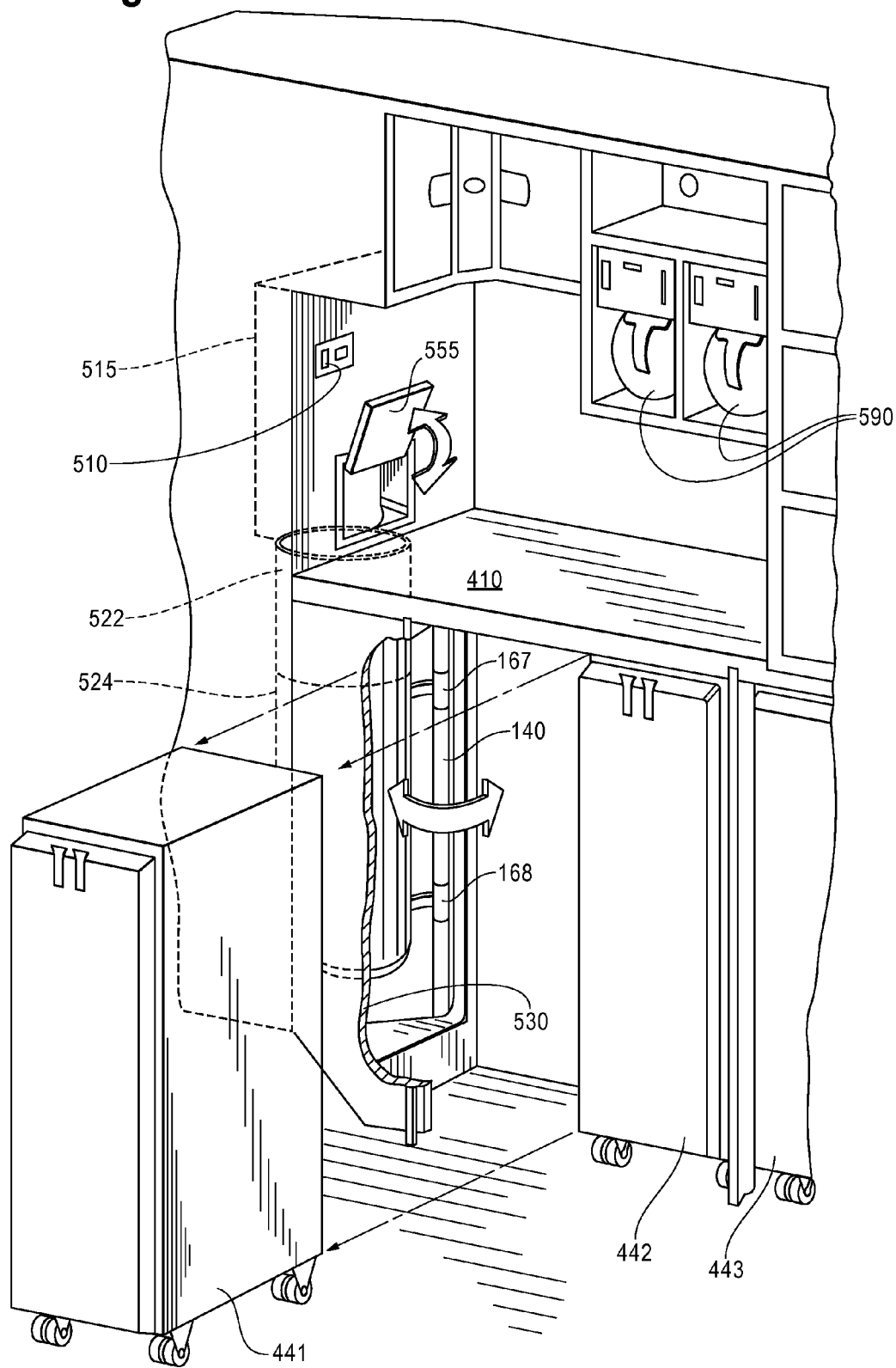
FIG. 5 shows a perspective view of an alternative embodiment comprising a side-loading chute.

In still other embodiments, neither a chute interface 125 nor a chute 150 are required. FIG. 5 shows such an embodiment. Trash is loaded after flipping up a side-loading flap 555 into a space directly above cylindrical storage chamber 524. A compactor mechanism 515 is disposed above the cylindrical storage chamber 524. The user interface 510 shown in FIG. 5 is used to start a compaction cycle. The user interface 510 may incorporate programmable logic or wireless components that permit for a delayed start of the compaction cycle, or remote activation.

Referring again to FIG. 1, latches 160 and 162 are shown. Latches 160 and 162 secure the compactor mechanism 110 and storage chamber 120 in position during operation. Latches may also be used to secure chute flaps 155 or 555 into place during takeoff and landing.

Figure 2:
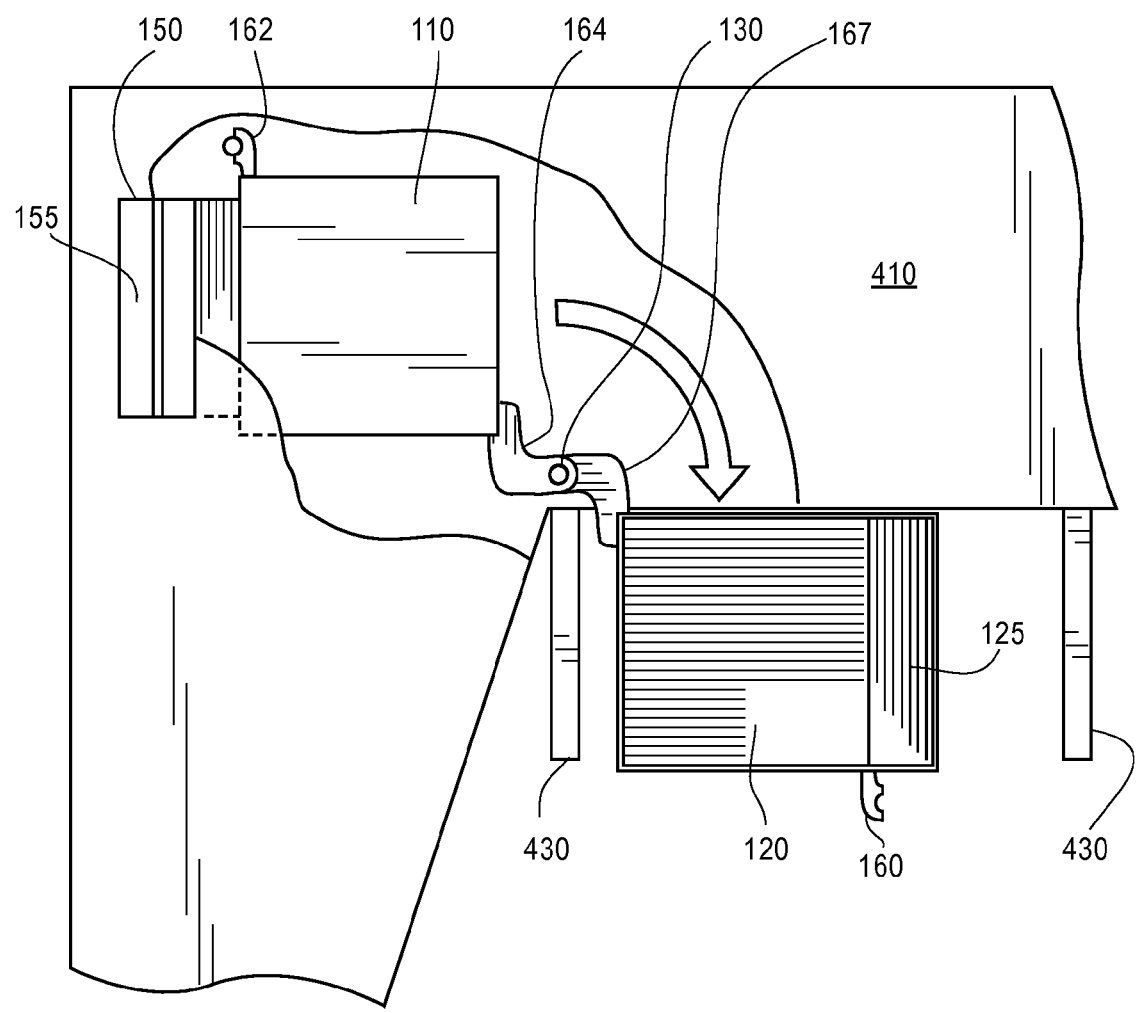
FIG. 2 shows a top view of the rotation of a compactor mechanism and storage chamber, in accordance with an embodiment of the invention.

As illustrated, the embodiment of FIG. 1 uses "dead space" otherwise inaccessible to galley devices. In several embodiments, this benefit is achieved through rotatable attachment of either or both of the compaction mechanism 110 and the storage chamber 120 to one or more axles 130 and 140 (not shown in FIG. 1). As shown in an embodiment in FIG. 2, the storage chamber 120 is rotatably attached to axle 140 by hinge 164. The storage chamber 120 is thus capable of swiveling or pivoting around axis 140. In the embodiment shown in FIG. 2, the storage chamber 120 has rotated 180 degrees around axle 140 into a maintenance or trash removal position. As shown in FIG. 2, when the storage chamber is in an operating position (indicated by dashed lines), the chute interface 125 is positioned directly below the trash chute 150 and chute flaps 155. Chute flaps 155 are provided to prevent trash from exiting the storage chamber suddenly during compaction. In the embodiment shown in FIG. 1, two chute flaps 155 are shown. In another embodiment, such as that shown in FIG. 5, a single flap 555 may be used.

Figure 3:
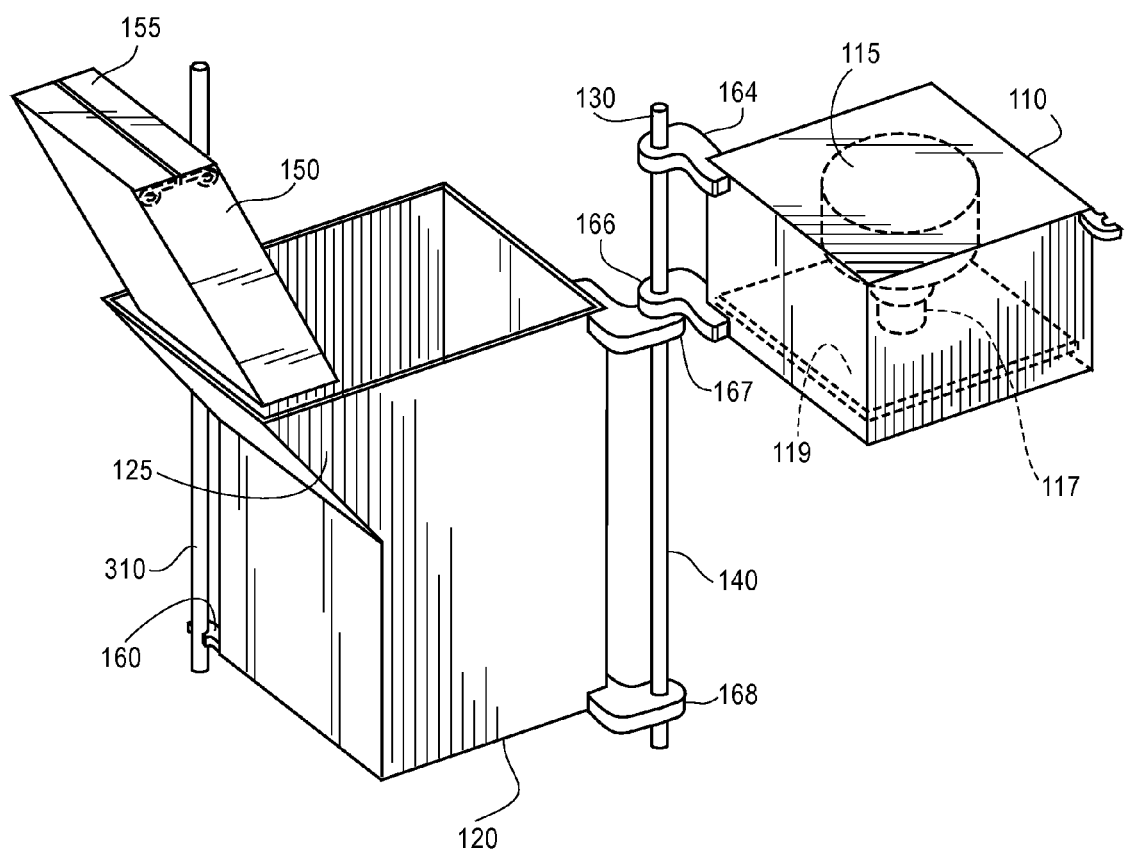
FIG. 3 shows a perspective view of a trash chute, chute interface, storage chamber, and compactor mechanism, in accordance with an embodiment of the invention.

FIG. 3 illustrates an embodiment of the invention in which the compactor mechanism 110 has been rotated into a maintenance position. The compactor mechanism 110 generally includes an actuator 115, drive shaft 117, and compactor plate 119. The actuator 115 may be any actuator suitable for use with aircraft power (including both fixed and wild frequency AC power) that provides sufficient force for compaction. For example, a hydraulic pump, discharge pump, or other pump-driven mechanical actuator may be used as a mechanism for generating force behind the compaction plate 117. Compaction plate 117 is adapted to press trash downwardly into the storage chamber 120 during operation.

In the embodiment of FIG. 3 the compactor mechanism 110 is mounted to an upper axle 130 and the storage chamber 120 is mounted to a lower axle 140. Hinges 164 and 166, 167 and 168 provide rotatable attachments to the upper and lower axles, respectively. In another embodiment, the compactor mechanism 110 and storage chamber 120 may be mounted to the same axle.

FIG. 3 also shows a rail 310 against which the base of the operating chamber remains flush during operation of the invention. In an embodiment, latch 160 is adapted to engage the rail 310 to secure the storage chamber 120 in position during operation.

In the embodiments shown in FIGS. 1-4, the storage chamber 120 has a rectangular footprint with a lip for the chute interface 125. In other embodiments not shown, the storage chamber 120 does not include a chute interface 125. In still other embodiments, such as that shown in FIG. 5, the cylindrical storage chamber 524 is disposed below a cylindrical chute 522, with the diameter of the chamber 524 and chute 522 being equal. The storage chamber 120 need not have a generally rectangular footprint as shown, and may have a circular, elliptical, or other footprint.

In addition, in some embodiments, the storage chamber 120 is not mounted to a lower axle 140. In such embodiments, the storage chamber may be movable in and out of operating position with castors alone, or with castors mounted to a load-bearing plate on which the storage chamber 120 rests. In other embodiments, the storage chamber may be secured to a load-bearing plate (not shown) mounted on rails for easy positioning of the storage chamber by crew. In such embodiments, one or more actuators may assist in positioning the storage chamber 120.

During long-range flights, a flight attendant may easily access the storage chamber one or more times during the flight for changing of liners as necessary.

Figure 4A:
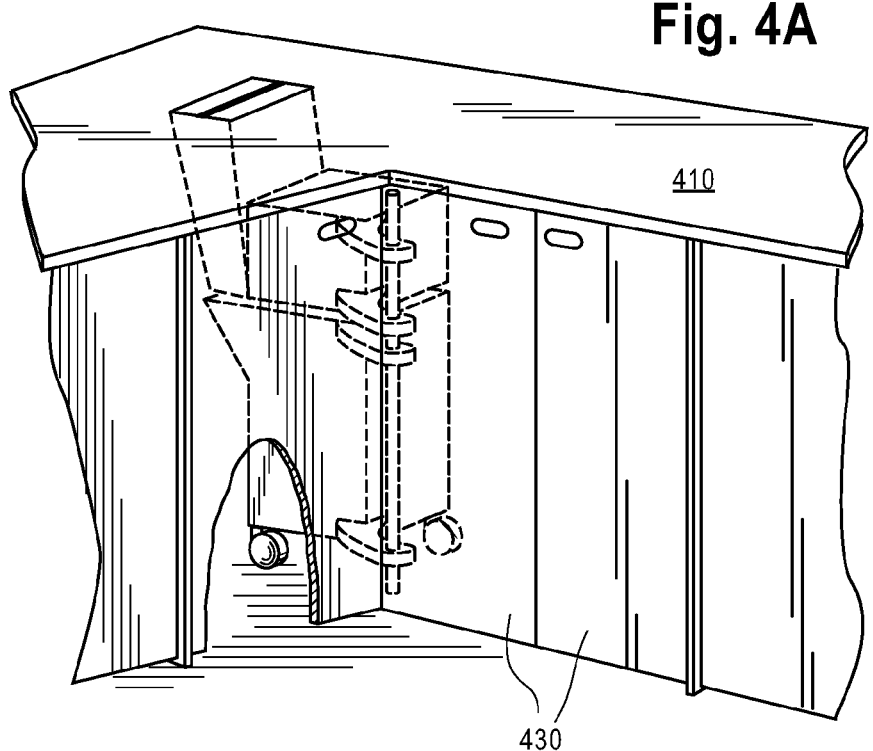
FIGS. 4A and 4B show left and right configurations for left and right sides of an aircraft, in accordance with an embodiment of the invention.
Figure 4B:
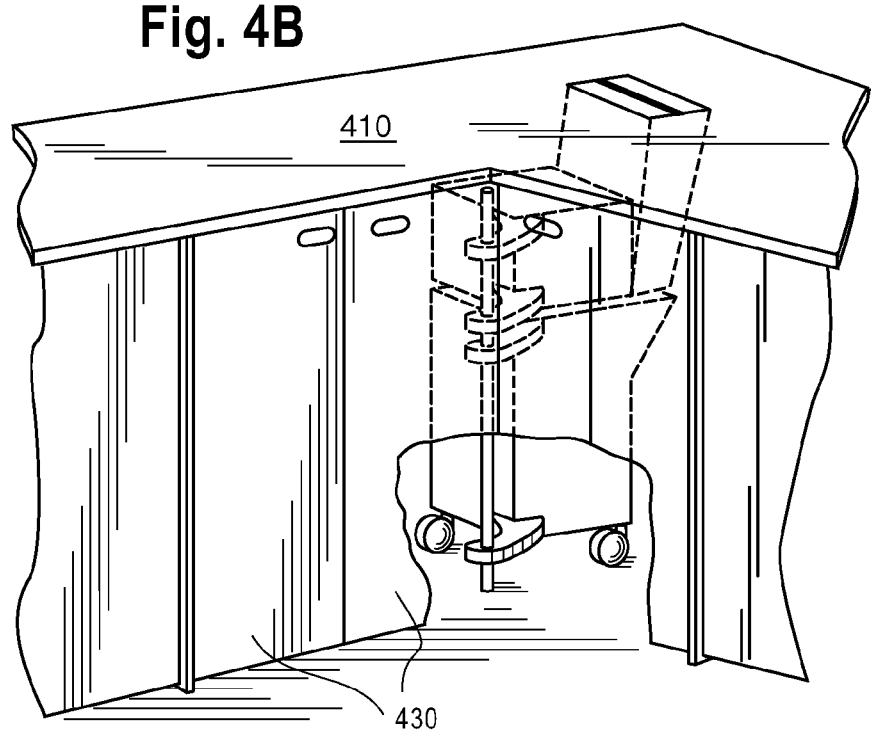

As illustrated in FIG. 4A, in an embodiment, the storage chamber 120 may be supported by castors which roll on the floor as the storage chamber is pivoted on the axle 140. In such an embodiment, the storage chamber 120 may be detachable from the axle 140 so that the storage chamber 120 may be rolled out from under the workdeck to provide easier access when changing liners. In addition, the castors may provide additional support if the storage chamber becomes heavy after it approaches capacity after several cycles of compaction. FIGS. 4A and 4B also illustrate right-hand and left-hand configurations of the trash compactor installed inn right-hand and left-hand symmetric aircraft galley configurations.

FIG. 5 shows another embodiment of the trash compactor comprising a side-loading chute flap 555, which permits trash to be dropped directly into cylindrical storage chamber 524. FIG. 5 also shows the workdeck 410, and two coffee makers 590 installed above the workdeck 410. The leftmost trolley or cart 441 can be rolled out to permit the storage chamber 524 to swivel out into a maintenance position, thereby permitting trash removal. Shown for illustrative purposes only are coffee pots 590, which might be installed in an aircraft galley.

A cutaway 530 in FIG. 5 shows in the interior of the space below workdeck 410. As shown in FIG. 5, the cylindrical storage chamber 524 is rotatably attached to axle 140 by hinges 167 and 168. After a compaction cycle, a trolley or cart 441 is rolled out from underneath workdeck 410 to permit the cyclindrical storage chamber 524 to be emptied.

To begin a compaction cycle, several different mechanisms are used in various embodiments. In one embodiment, a locking mechanism on the trash chute door triggers the compaction cycle. In another embodiment, the compaction cycle is initiated from a dedicated remotely located panel that also contains a display device for indicating equipment status (operational, in-op, trash level, diagnostics, servicing, etc.). In still another embodiment, the compaction cycle is triggered from a central galley control interface that serves multiple functions, one of which is the TC mode which handles TC operation/status/diagnostics/servicing functions. In all cases, safety interlocks may be required before a compaction cycle begins.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for compacting trash while in-flight, the method comprising steps of:
    moving a storage chamber into a chamber operating position within a dead space that is adjacent to a galley cart storage area but only accessible laterally from the galley cart storage area;
    securing the storage chamber in the chamber operating position;
    executing a compaction cycle; and
    removing the storage chamber into a chamber maintenance position in which compacted trash is removable from the storage chamber accessible from in front of the galley.

2. The method of claim 1, further comprising steps of:
    receiving trash into the storage chamber through a chute connected to the storage chamber.

3. The method of claim 2, wherein a loading end of the chute comprises a flap.

4. The method of claim 1, wherein the step of executing a compaction cycle is initiated by a remote user interface.

5. The method of claim 1, further comprising receiving trash into the storage chamber from a level of a workdeck accessible from in front of the galley while the storage chamber is in the chamber operating position.

6. The method of claim 1, wherein executing the compaction cycle comprises compacting trash within the storage chamber by a compactor mechanism disposed above the storage chamber.

7. The method of claim 1, wherein removing the storage chamber into the chamber maintenance position comprises rotating the storage chamber from the chamber operating position to the chamber maintenance position about a chamber axle.

8. The method of claim 1, wherein executing the compaction cycle is initiated by a trash level sensor.

9. The method of claim 1, further comprising pressing trash into the storage chamber by a trash chute which channels trash into the storage chamber prior to executing the compaction cycle.

10. The method of claim 1, further comprising preventing trash from exiting the storage chamber during execution of the compaction cycle by a trash chute which channels trash into the storage chamber.

11. The method of claim 1, wherein removing the storage chamber into the chamber maintenance position comprises removing a cart that is in the galley cart storage area and that occupies space comprising the chamber maintenance position.

* * * * *